M. CLARK.
PNEUMATIC TIRED VEHICLE WHEEL.
APPLICATION FILED AUG. 16, 1912.
1,135,258.
Patented Apr. 13, 1915.
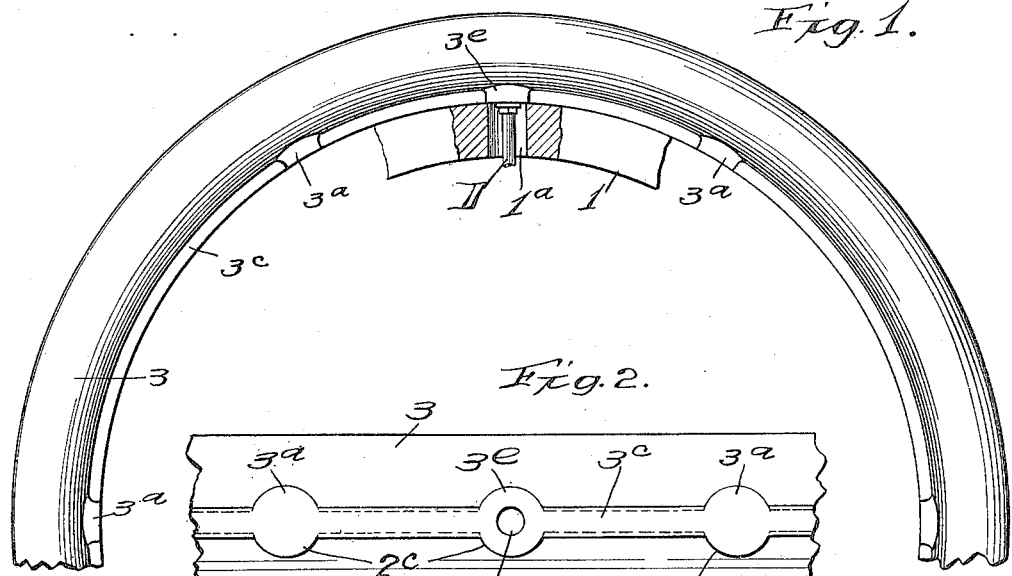
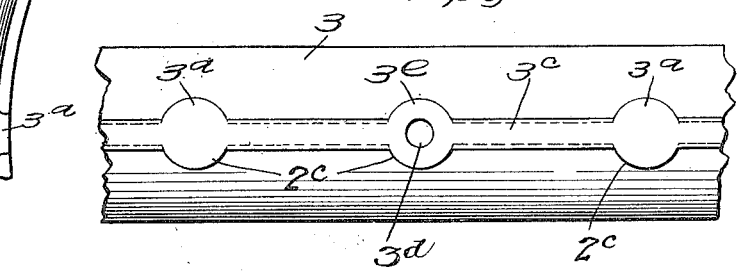
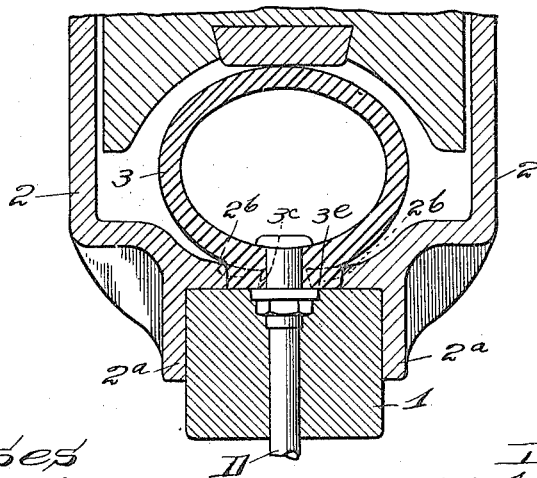
Witnesses
Inventor:
Melville Clark.
by Burton & Burton
Att'ys

UNITED STATES PATENT OFFICE.

MELVILLE CLARK, OF CHICAGO, ILLINOIS.

PNEUMATIC-TIRED VEHICLE-WHEEL.

1,135,258.  Specification of Letters Patent.  Patented Apr. 13, 1915.

Application filed August 16, 1912. Serial No. 715,397.

*To all whom it may concern:*

Be it known that I, MELVILLE CLARK, a citizen of the United States, residing at Chicago, in the county of Cook and State of Illinois, have invented new and useful Improvements in Pneumatic-Tired Vehicle-Wheels, of which the following is a specification, reference being had to the accompanying drawings, forming a part thereof.

The purpose of this invention is to provide an improved construction of pneumatic tired vehicle wheel of the type which comprises a pneumatic or air spring, and it consists in improved features of construction for holding the pneumatic tube securely and preventing injury by reason of the presence and mode of providing for the insertion of the inflating nozzle.

In the drawings:—Figure 1 is a side elevation of a portion of the tire and felly, the latter part being in section. Fig. 2 is a plan view of the inner or rim portion of the tire. Fig. 3 is a transverse section of the tire showing the inner tube and parts of the side flanges and tread mounted on the felly of the wheel.

In the drawings, this invention is shown applied to a wheel of a type which is familiar in its general features, comprising a wooden felly, 1, having bound upon its opposite sides metal guards 2, 2, between which the pneumatic tube member, 3, is lodged. The guards, 2, 2, are secured to the felly by means of the two flanges at right angles to each other, the flange, $2^a$, being bound against the lateral surface of the felly and the flange, $2^b$, being seated upon the periphery of the felly. The pneumatic tube, 3, has formed integrally with it on its inner circumference and protruding radially inward therefrom a plurality of bosses, $3^a$, distributed about said inner circumference at suitable intervals. These bosses are connected by a rib, $3^c$, at the inner circumference of the pneumatic tube, said rib and bosses being formed integrally with the tube in a manner which is well understood by those familiar with the art of making such tubes which are constructed of fabric and rubber, the fabric extending into the bosses and ribs so as to be the greater part of the substance thereof, rendering them tough and stubborn and so completely integral with the body of the tube that detachment will only occur by substantial destruction of the tube. The flanges, $2^b$, of the guards, 2, have their proximate edges at the circumference of the felly separated by a space wide enough to accommodate the rib $3^c$. Preferably, the facing edges of the flanges are slightly undercut, making the space between them in cross section dovetailed, and the rib, $3^c$, is correspondingly dove-tailed in cross-section so that secure engagement of the pneumatic tube is effected when the rib is engaged between said flanges. These flanges have at points in the circumference of the wheel corresponding to the positions of the bosses, $3^a$, oppositely positioned notches, $2^c$, which receive said bosses, the latter fitting snugly in the notches when the dove-tailed rib is engaged in the dove-tailed space between the flanges. Such engagement of the bosses in the notches of the guard flanges effectually checks any tendency of the pneumatic tube to creep around the wheel.

An additional boss, $3^e$, similar to the bosses, $3^a$, is provided at the point in the inner circumference of the pneumatic tube at which the inflating nozzle, D, is to be inserted, said boss being apertured to receive said nozzle, as seen at $3^d$ in Fig. 2. The felly is apertured as usual to permit the inflating nozzle to protrude through it, and as usual, for convenience in assembling the parts and avoiding the necessity for rigidly exact positioning of this aperture with respect to the other features of the wheel rim, the aperture is elongated circumferentially with respect to the wheel. The boss, $3^e$, being of sufficient extent to completely cover the elongated aperture, $1^a$, of the felly, operates as a bridge thereover, and prevents the depression of the tube into the aperture, such as is liable to occur from the inflation of the tube at high tension, and which often causes injury to the tube at this point when not prevented.

I claim:—

In a vehicle wheel, in combination with the felly, a pneumatic tube having formed integrally with it a plurality of radially projecting bosses distributed at intervals in its inner circumference and a rib integrally connecting the bosses, and lateral metal guards bound on to opposite sides of the felly for inclosing the pneumatic tube having flanges which encompass the felly and projecting toward each other embracing said rib of the pneumatic tube between their proximate edges, said proximate edges having oppositely positioned notches which receive and fit the bosses of the tube.

In testimony whereof, I have hereunto set my hand, at Chicago, Illinois, this 6th day of August, 1912.

MELVILLE CLARK.

Witnesses:
CHAS. S. BURTON,
M. GERTRUDE ADY.

Copies of this patent may be obtained for five cents each, by addressing the "Commissioner of Patents, Washington, D. C."